United States Patent [19]
Zovath

[11] Patent Number: 5,278,530
[45] Date of Patent: Jan. 11, 1994

[54] SWITCH MECHANISM, MOUNTING ASSEMBLY, AND SHAFT POSITION INDICATOR DEVICE FOR A ROTARY OR LINEAR VALVE

[76] Inventor: Peter J. Zovath, 3902 Crow Valley, Missouri City, Tex. 77459

[21] Appl. No.: 778,332

[22] Filed: Oct. 17, 1991

[51] Int. Cl.$^5$ .......................................... H01H 73/12
[52] U.S. Cl. .................................... 335/17; 335/185
[58] Field of Search ............... 335/185, 186, 187, 188, 335/189, 190, 191, 64, 65, 68, 17

[56] References Cited

U.S. PATENT DOCUMENTS

| | | |
|---|---|---|
| 3,446,924 | 5/1969 | Giabertoni . |
| 3,711,797 | 1/1973 | Flanagan et al. . |
| 3,740,680 | 6/1973 | Schneidinger . |
| 3,754,106 | 8/1973 | MacDonald . |
| 3,781,499 | 12/1973 | Reichert et al. . |
| 3,903,383 | 9/1975 | Marker . |
| 4,107,500 | 8/1978 | Distler et al. . |
| 4,160,221 | 7/1979 | Ohara . |
| 4,214,133 | 7/1980 | Wolford et al. . |
| 4,288,671 | 9/1981 | Morrison . |
| 4,752,657 | 6/1988 | Kane et al. . |
| 4,788,517 | 11/1988 | Meister et al. . |
| 4,800,241 | 1/1989 | McNamara . |
| 4,831,350 | 5/1989 | Rose . |
| 4,962,290 | 10/1990 | Nelson . |

*Primary Examiner*—Lincoln Donovan
*Attorney, Agent, or Firm*—Suzanne Kikel

[57] ABSTRACT

A magnetically actuated valve position sensing device for a linear or rotary valve comprising a switch housing completely enclosing one or more magnetic proximity switches. A mounting assembly comprises an outer housing for slideably receiving the switch housing, a magnetic rotary indicator on top the outer housing for indicating an open/close position for the valve and for actuating the switches in response to the shaft positions, and a shaft assembly for connecting the rotary indicator to the shaft of the rotary or linear valve. A bracket assembly mounts the switch housing to a stationary member of a linear valve and comprises brace members carrying magnets and connected to the linear valve shaft whereby the magnets actuate the switches upon translational movement of the brace members and the reciprocation of the linear shaft.

32 Claims, 7 Drawing Sheets

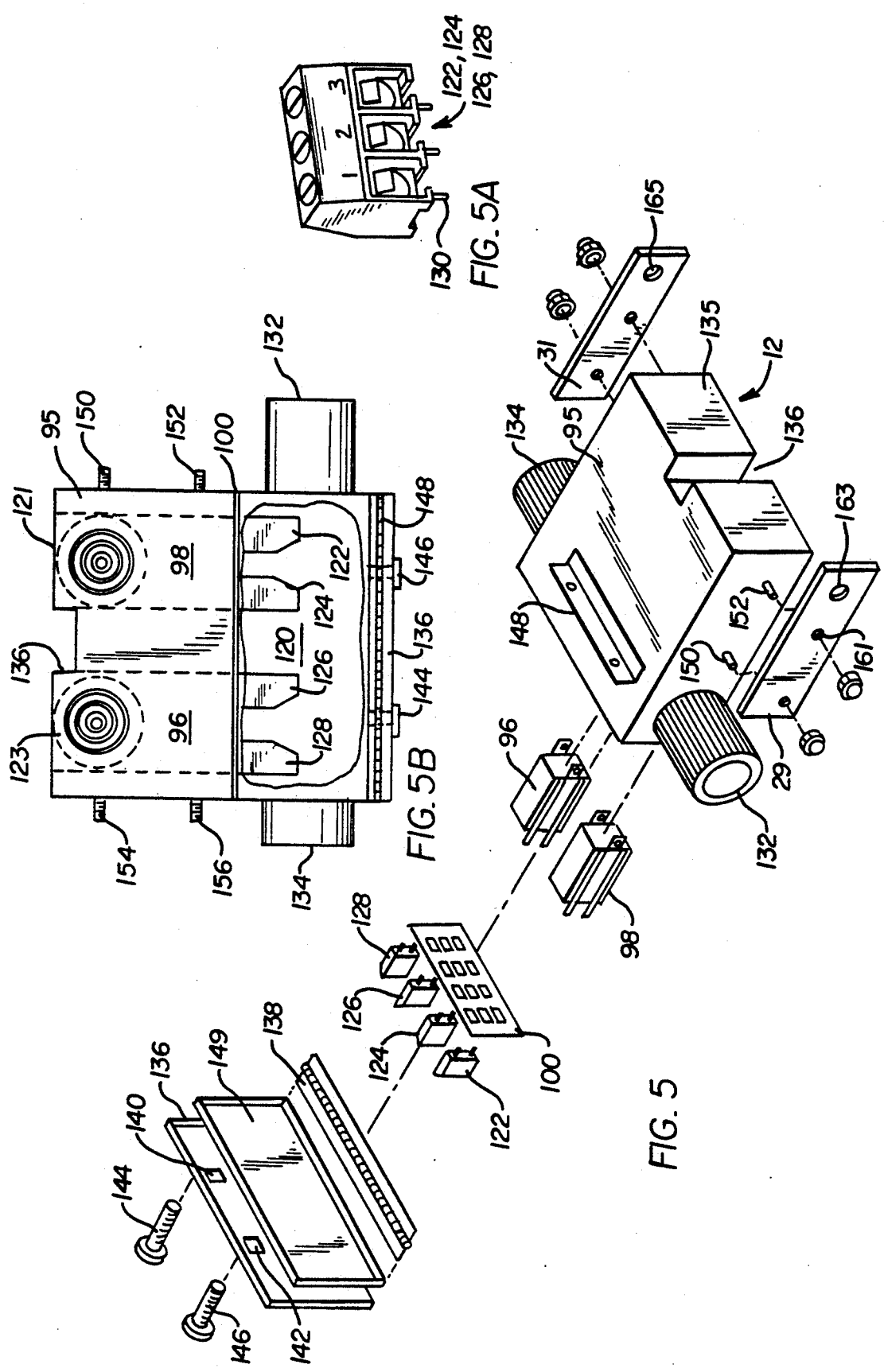

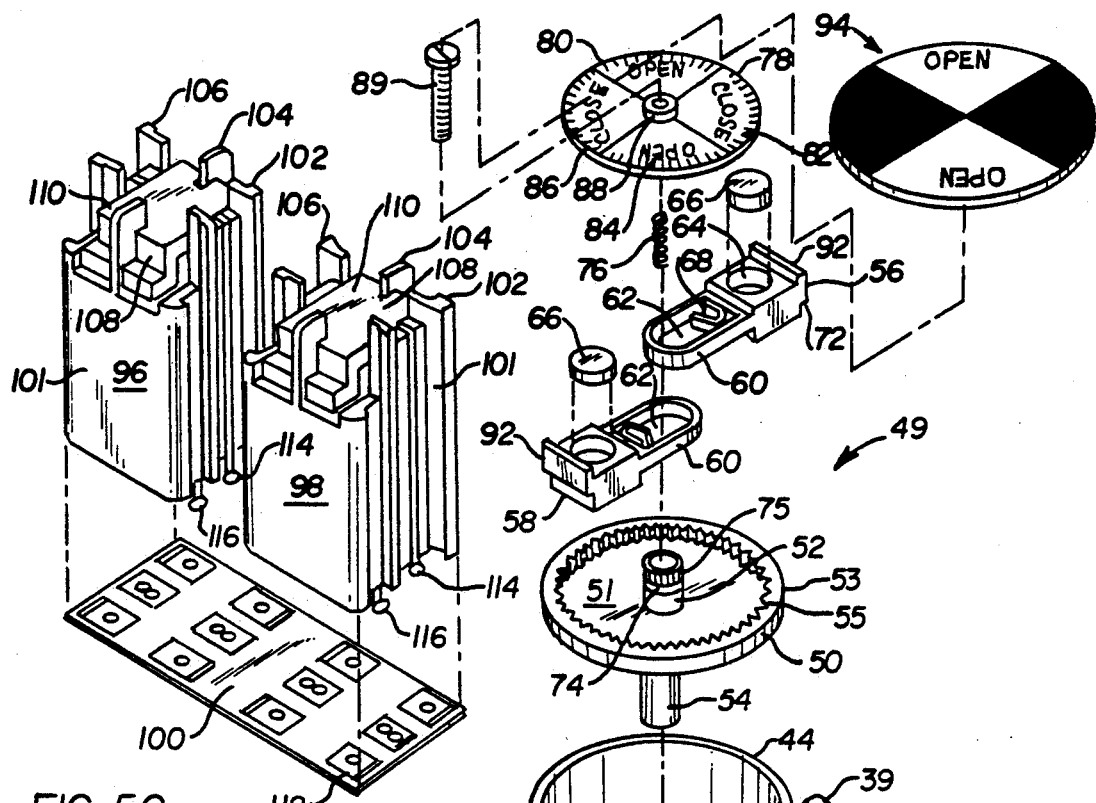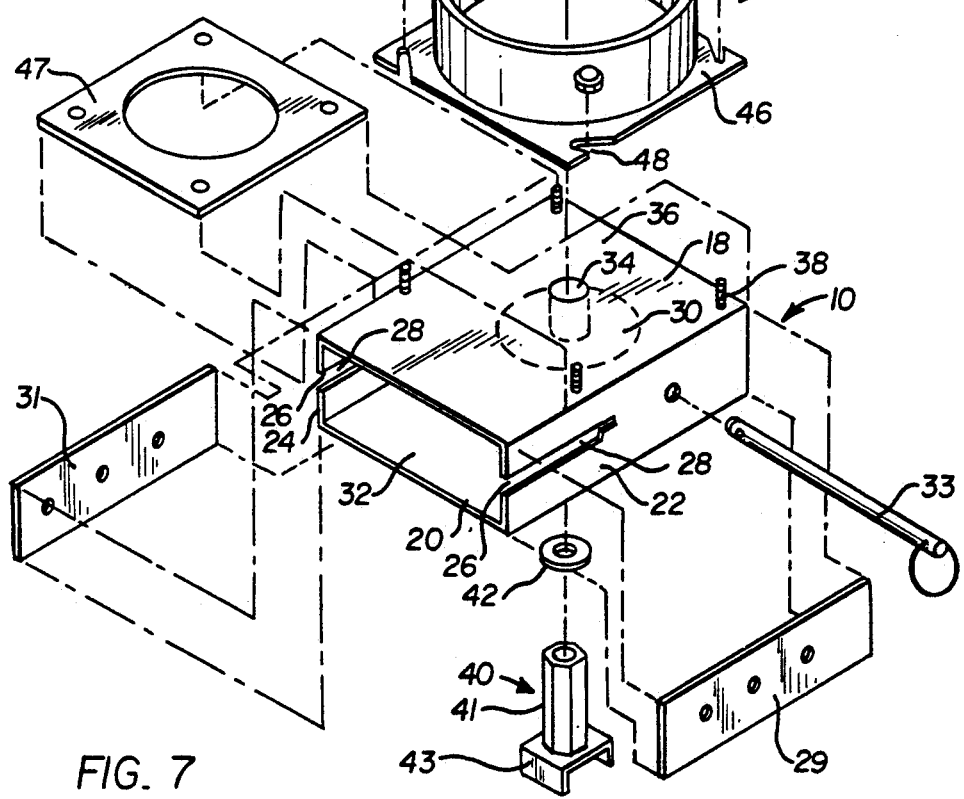
FIG. 5C
FIG. 7

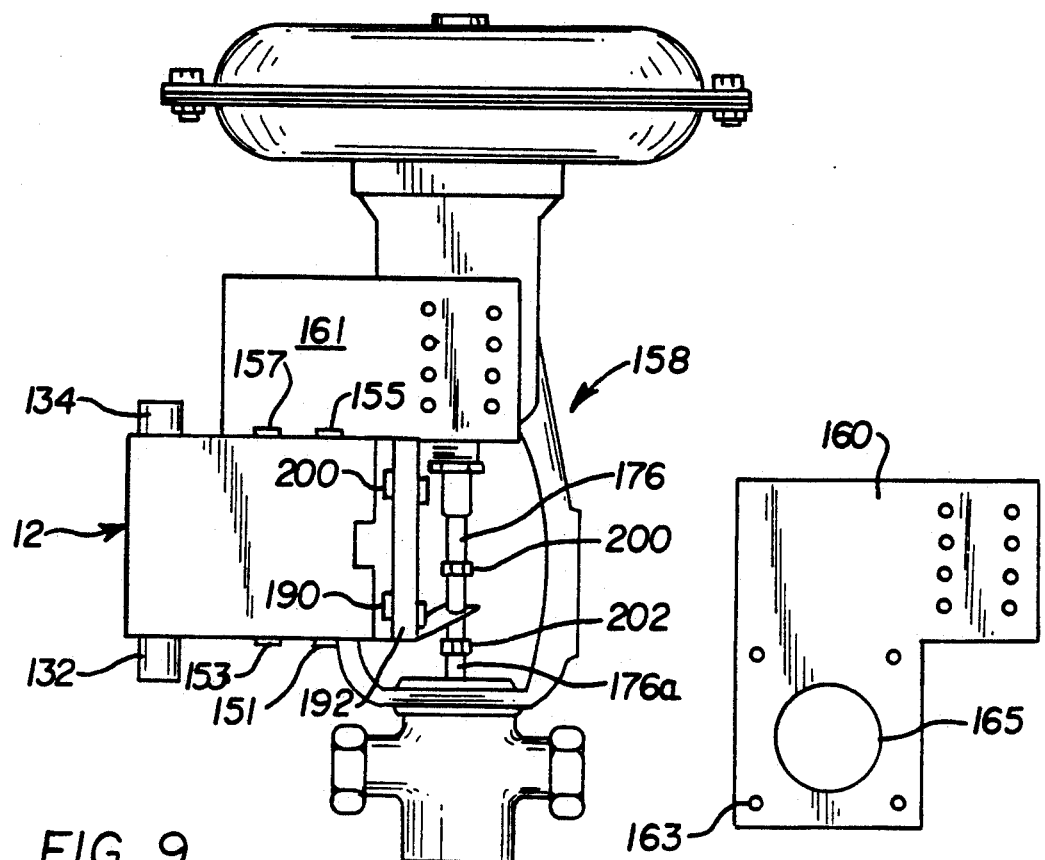
FIG. 9
FIG. 8C
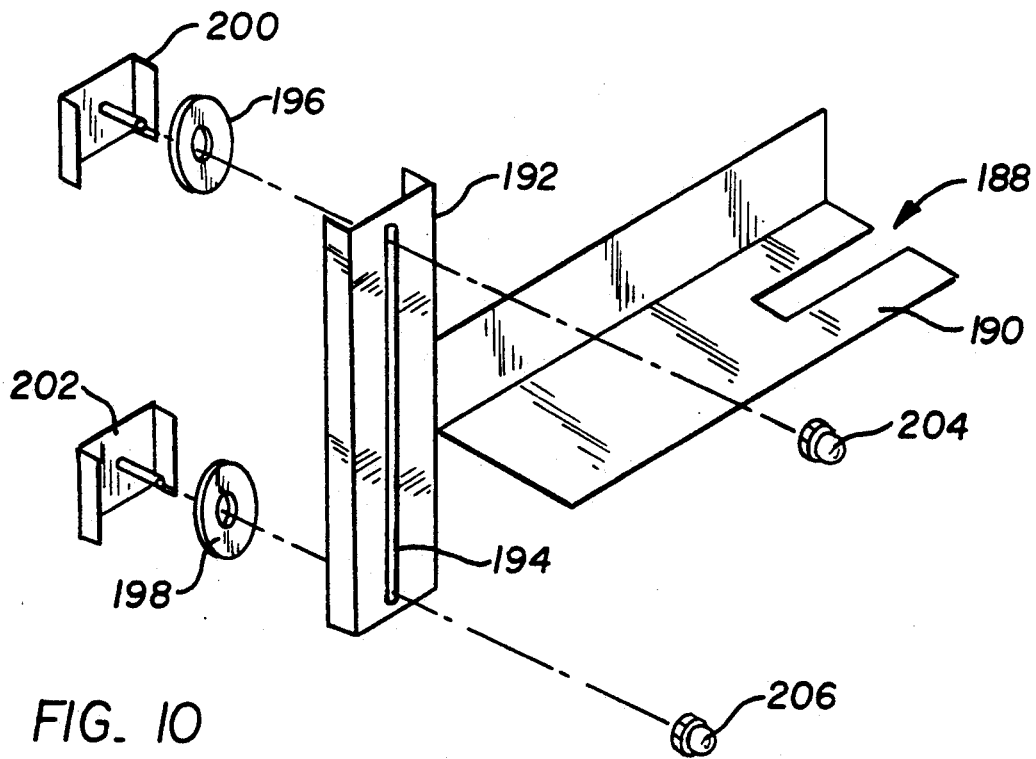
FIG. 10

SWITCH MECHANISM, MOUNTING ASSEMBLY, AND SHAFT POSITION INDICATOR DEVICE FOR A ROTARY OR LINEAR VALVE

BACKGROUND OF THE INVENTION

1. Field of the Invention

This invention relates generally to an apparatus providing a signal indicating the position of a shaft for a valve or like devices, and more particularly, to a housing for a switch device, a shaft position indicating mechanism incorporating a visual display of the shaft position, and a mounting assembly for mounting the switch device to a rotary valve or a linear valve, and/or actuators.

2. Description of the Prior Art

In general, electrical switch means are used for various applications such as in fluid or other flow systems. One particular application is in a flow line for monitoring and regulating the condition of a rotary or linear valve and/or actuator (i.e. open or closed) and/or to control the opening or closing of successive valves in the flow lines as a function of the preceding valves. The prior art included electrical switches that are mechanically activated in response to this operative state of the valve.

These mechanically actuated switches are frequently subjected to severe environmental conditions, including dust, moisture, or other corrosive or explosive foreign matter. Such adverse environmental conditions have a deleterious effect on the electrical switches and over a period of time may lead to switch malfunctioning causing erroneous indicator and control signals.

Attempts have been made to solve the problems associated with prior art devices, particularly for rotary valves. U.S. Pat. No. 4,214,133 provides a rotary shaft position indicator and control in which microswitches are enclosed within a housing that is sealed against the introduction of adverse matter. The microswitches are activated by a magnetic coupling through a wall of the housing. Even though a sealed switch cavity is provided, the switch and switch activating structure requires many mechanical components.

A less complex structure for a rotary shaft position indicator with a sealed switch cavity is disclosed in U.S. Pat. No. 4,831,350. This device utilizes magnetically actuated reed switches. A cylindrical dome houses the reed switches. The dome screws onto a secondary housing member and the reed switches are screwed to the secondary housing member. An external switch actuating structure comprises a magnet holder mounted to the housing for rotation with the rotary shaft. The entire dome assembly with the switch actuating device is mounted on the shaft of a rotary valve.

Both U.S. Pat. Nos. 4,214,133 and 4,831,350, as well as other valve position sensing devices of the prior art, lack means for visibly displaying the orientation of the rotary shaft.

Such an attempt was made in the disclosure of U.S. Pat. No. 4,962,290. The base is designed to support a flared drum on the outer surface of which are graphic characters indicating an "open" or "closed" position. The "open" and "closed" position of the rotary shaft is viewable through a window on a fixed indicator cover and visible from the above and the sides. One drawback with the devices of U.S. Pat. Nos. 4,214,133 and 4,962,290 is the difficulty involved in mounting and replacing the switches which are actuated by cam elements mounted on a rotary shaft in alignment or connected to the rotary valve shaft. Another drawback to the shaft positioning sensing devices of the aforesaid patents is that the cavity sealing effect is broken when the switches are to be adjusted and/or replaced, that is, the dome cover must be removed.

Still another problem with the prior art shaft indicators relates to the inability to adapt to either a rotary valve or a linear valve found in the field with which the indicators are to be used.

A still further problem with the prior art is that the electrical switches are preferably for low voltage and low current applications such as the reed switches of U.S. Pat. No. 4,831,350.

A still further problem with the prior art is that the shaft of the valve protrudes through the enclosure of the shaft position indicating mechanism. This results in sealing of the shaft being difficult to achieve, costly, and subject to leaking. Additionally, there are very stringent requirements on rotary shaft seals for explosive proof devices.

There is further lacking in the prior art a design for a valve position sensing and/or indicating device which eliminates the guess work and labor involved in replacing the switches in the assembly. There is further lacking in the prior art a valve position sensing and/or indicating device, which is compact, relatively small, and which does not interfere with other devices on the valves.

SUMMARY OF THE INVENTION

The present invention has solved the above described problems by providing a shaft position sensing, indicating, and display apparatus for use with valves having a rotatable shaft or a linear shaft. The apparatus includes a unitary, switch housing which is classified as being "explosive" proof or "non-explosive" proof, and which can be easily removed and replaced in a compact mounting assembly mounted on a rotary valve or on a linear valve, or like devices.

Preferably, a switch mechanism comprises two spaced apart magnetic proximity switches mounted in the switch housing which is generally rectangular in shape and fully enclosed. The proximity switches are disposed toward one end of the housing. A fiberglass terminal plate extends the width of the housing and is connected to the proximity switches to form a cavity at the other end of the switch housing. The terminal plate contains a number of electrical contacts for electrically connecting terminal strips to the proximity switches. The terminal strips extend into the cavity in the switch housing, and provide for the attachment of field wires, which run into the cavity of the switch housing and out of a conduit attached to the side of the switch housing. The terminal plate can accommodate as many as four terminal strips. For each proximity switch, one terminal strip is used for effecting a single pole, double throw (SPDT) proximity switch or two terminal strips are used for effecting a double pole, double throw (DPDT) proximity switch. One embodiment for the switch housing provides a non-explosive type having a hinged door for access into the cavity. A second terminal plate with terminal strips can be placed on the inside of the hinged door, thereby providing added capacity for electrical wiring connections. A second embodiment for the switch housing provides an explosive type of enclosure where all side walls are welded together and the cavity is filled with a red epoxy, thereby preventing access into the switch housing.

A mounting assembly for the rotary valve is mounted onto the top of the rotary actuator and includes an open ended, generally rectangular housing for slideably receiving the switch housing. A position indicator device is mounted on top the mounting assembly, and includes a magnetic switch actuating device which is part of a dial assembly which contains indicia representing an opened or closed condition for the rotary valve. The mounting assembly for the rotary valve can be used for a linear valve, whereby it is mounted to a stationary member of the valve by a bracket plate that has a mounting bolt pattern that matches that of the switch-/mounting assemblies, and a bracket system converts the linear movement or reciprocation of the shaft into rotary motion for operation of the magnetic dial indicator.

A second embodiment of a mounting assembly for the linear valve includes a bracket plate having two L-shaped brackets for mounting the switch housing. An elongated bracket carries two magnets for actuating the proximity switches, and the elongated bracket is connected by a member to the shaft, whereby the linear movement of the shaft results in translational movement of the magnets for actuation of the switches.

It is, therefore, an object of the invention to provide a switch mechanism and a mounting assembly for use in a rotary valve or a linear valve.

It is a further object of the invention to provide a valve position sensing apparatus which is efficient, safe, relatively small in size, and simple in design and operation.

It is a further object of the invention to provide a unitary enclosed switch housing for a valve position sensing device which can be interchangeably used in a mounting assembly for a rotary valve or in a mounting assembly for a linear valve.

It is a further object of the present invention to provide a unique design for a mounting assembly used in a rotary valve arrangement.

It is a further object of the invention to provide a unique design for a mounting assembly used in a linear valve arrangement.

It is a further object of the invention to provide a valve position sensing device with indicator means and switch actuator means which remain intact with the valve actuator shaft while the switch housing is easily removed and replaced, without effecting the rating.

It is a further object of the invention to provide a switch housing which is easily slideable in and out of a mounting assembly, and which switch housing can be replaced with little or no adjustments needed to any of the components of the mounting and the switch assemblies.

It is a further object of the invention to provide a switch housing which is separate from the mounting assembly and the adjustment and/or indicating device so that the housing of the switches does not have to be removed or the sealing broken when the switches and-/or visual indicators are reset and/or adjusted.

It is a further object of the invention to provide a switch housing which houses magnetic proximity switches and electrical contacts for either single pole, double throw switches, or double pole double throw switches which can be used for low voltage, low current applications or for high voltage, high current applications by means of the required contacts.

It is a still further object of the invention to provide a valve position indicating device with a fully enclosed switch mechanism which does not require the shaft of the valve to protrude into the enclosure of the switch mechanism for operation of the indicating device.

These and other objects of the invention will be more fully understood from the following description of the invention on reference to the illustrations appended hereto.

BRIEF DESCRIPTION OF THE DRAWINGS

FIG. 5 is an exploded view of a first embodiment of the invention for a non-explosive proof type of switch mechanism shown in FIG. 1;

FIG. 5a is an enlarged perspective view showing one of the terminal strips in FIG. 5;

FIG. 5b is a partially broken away, elevational view illustrating the switch mechanism of FIG. 5;

FIG. 5c is a schematic exploded view illustrating two switch assemblies and a terminal plate;

FIG. 7 is an exploded perspective view of the mounting assembly and shaft position indicator shown in FIG. 1;

FIG. 8b is an exploded view of FIG. 8a;

FIG. 8c is an elevational view showing the bracket plate for mounting the switch mechanism and mounting assembly of FIG. 8;

FIG. 9 is a side elevational view of a second embodiment of a mounting assembly for a linear shaft with a switch mechanism and operatively mounted on a linear valve mechanism, and showing a second embodiment of a magnetic mechanism for actuating the switch mechanism as a function of the shaft movement in a linear valve mechanism;

FIG. 10 is an enlarged, exploded perspective view showing the second embodiment for a magnetic mechanism of FIG. 9.

DETAILED DESCRIPTION OF THE PREFERRED EMBODIMENTS

Figure 1:
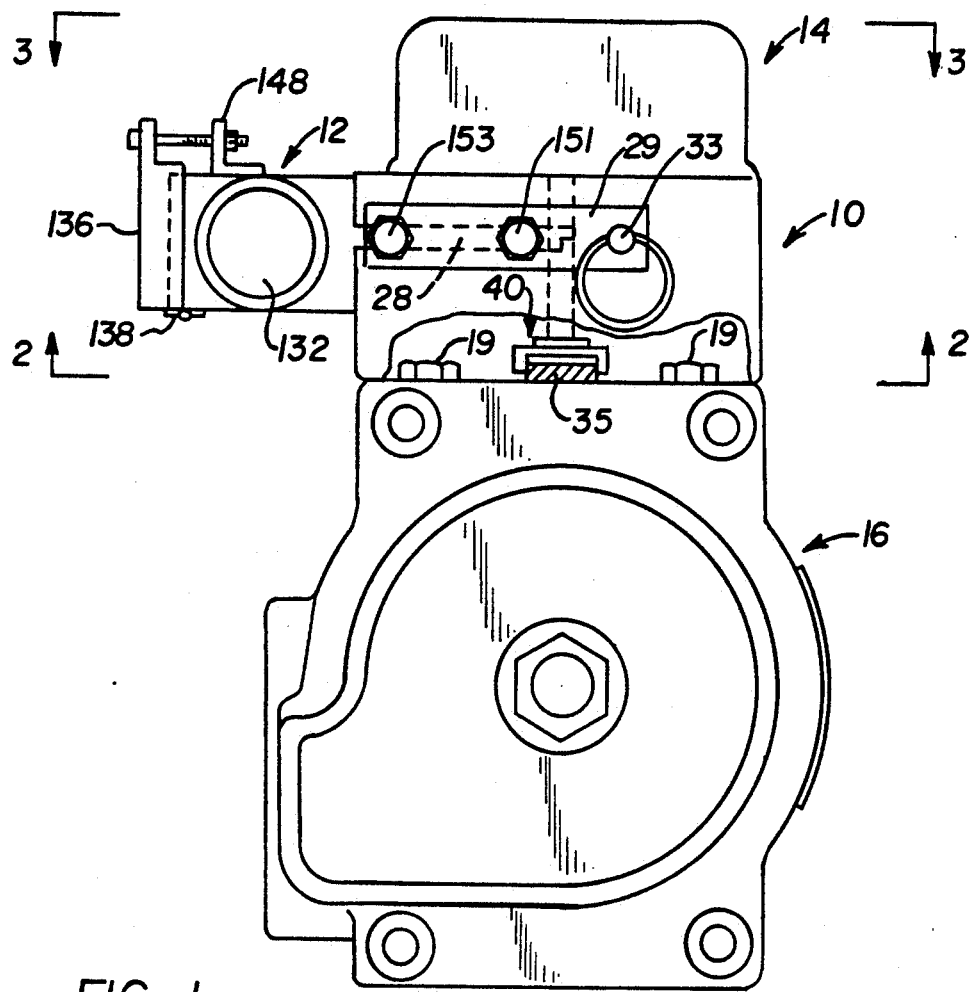
FIG. 1 is a partly broken away side elevational view of a first embodiment of a mounting assembly for a rotary shaft with a switch mechanism and a rotary position indicator and control device of the present invention, operatively mounted on a rotary valve mechanism.

Referring to the drawings, FIGS. 1-10, wherein like numerals represent like parts throughout the several views, one embodiment of an arrangement for a mounting assembly 10 and a switch mechanism 12 and a rotary shaft position indicator and control device 14 for a rotary valve 16 is particularly illustrated in FIGS. 1, 2, 3, 4, and 7.

Essentially, the rotary shaft position indicator and control device 14 is stationarily mounted onto mounting assembly 10, and switch mechanism 12 is slideably received in mounting assembly 10, more about which will be discussed hereinafter.

Referring particularly to FIGS. 1, 2, 3 and 7, mounting assembly 10, preferably comprises a rectangular housing 18. Housing 18 has several mounting holes seen best in FIG. 2 and one of which is indicted at 17. As seen in FIG. 1, bolts, two of which are indicated at 19, affix mounting assembly 10 to rotary valve arrangement 16. Housing 18 has an open end 20 (FIG. 7) along its width. The side walls 22 and 24 adjacent this open end 20 each has a cut-out area 26 communicating with open end 20, and which cut-out area 26, in turn, communicates with a rectangular slot 28. This allows switch mechanism 12 to be inserted and secured in housing 18, as particularly shown in FIG. 1. Slide and lock plates 29, 31 are held to housing 18 by means which will be discussed hereinafter.

In securing switch mechanism 12 in mounting assembly 10, a quick release pin 33 is pushed through side-lock plate 29 through mounting assembly 10, and through side-lock plate 31 providing a positive mechanical lock for switch mechanism 12. Switch mechanism 12 will not back out of the mounting assembly 10 upon vibrational conditions or extreme inclement conditions which may cause contraction or expansion of the system.

Housing 18 has an open circular aperture 30 on its under wall 32, and an open hub shaft element 34 extending down from its upper wall 36. Several threaded studs, one of which is indicated at 38, extend upwardly up and through top wall 36 for fastening the rotary position indicator and control device 14 onto housing 18.

Housing 18, preferably is made of flat sheet metal which is bent and welded into the configuration shown in FIG. 7. Hub element 34 is also made of metal which is welded to the under surface of top wall 36.

In still referring to FIG. 7, a shaft adaptor 40 extends through a washer 42 and up through shaft element 34 of housing 18. This shaft adaptor 40 is used to connect the shaft of the rotary valve mechanism 16 to the rotary position indicator and control device 14. Shaft adaptor 40 comprises a hex shaft member 41 and an interchangeable base 43. Member 41, preferably, is hex shaped as shown in FIG. 7 and has internal threads, more about which will be discussed hereinafter. Shaft member 41 and base 43 are preferably welded together. The internal dimension of base 43 is made to correspond to the outer diameter of the output shaft 35 (FIG. 1) of valve 16. Typically, this internal dimension is 0.375 inch, however, it can be from two to three inches.

The rotary position indicator and control device 14 is best shown to the top of FIG. 7. This device 14 comprises a dome housing 44, a base plate 46, and a gasket 47. Preferably, for off-shore applications, housing 44 and 46 are made of flat sheet metal, where housing 44 is bent in a circular configuration and welded along one seam. Preferably, housing 44 is welded onto base plate 46. For less rigorous applications, housing 44 and base plate 46 can be molded and made out of a thermoplastic material. Plate 46 has several cut-out sections, one of which is indicated at 48 for receiving threaded studs 38, of housing 18 of mounting assembly 10. Several locknuts 39 lock base plate 46 to housing 18 of mounting assembly 10. The cut-out sections 48 allow for base plate 46 to be removed without removing locknuts 39. Locknuts 39 are loosened, plate 46 is turned and slid away from studs 38, and then lifted. This decreases the chance of loosening locknuts 39 or gasket 47 when removing plate 46. Also, in view of the construction of the invention, removal of base plate 46 does not effect the rating of switch mechanism 12.

A dial assembly for position indicator and control device 14 is shown at 49 in FIG. 7. This dial assembly 49 comprises a circular base plate 50, which has an upper hub member 52 and a lower hub member 54. Base plate 50 has an open upper surface 51 with a circular sidewall 53 which has a number of teeth, one of which is indicated at 55. Preferably, base plate 50 is made of molded plastic. Base plate 50 supports magnet holders 56 and 58, which are disposed in open upper surface 51.

Each magnet holder 56, 58 has an extension 60 with an opening 62 and a cavity 64 for receiving a magnet 66. The extensions 60 of magnet holders 56, 58 are disposed at different positions along the axis of the holders 56, 58. This allows the holders 56, 58 to overlap each other and be nested close together without interfering with each other when assembled on member 52 of base plate 50. Each magnet holder 56, 58 has a number of teeth on its underside indicated at 72 in FIG. 7, which teeth 72 meshes with the teeth 55 on sidewall 53 of base plate 50. Each holder 56, 58 has a spring clip 68 located in opening 62. Spring clip 68 is held in place by projections not shown which are part of holder 56, 58. Spring clip 68 contacts member 52 and causes holders 56, 58 to be positively held outwardly away from shaft member 52, keeping holders 56, 58 in place with the teeth in base plate 50.

Holders 56, 58 provide sufficient space capacity for holding magnets 66. Magnets 66 are potted, which involves the use of an epoxy resin compound which seals, protects, and holds the magnets in place in cavity 64. Preferably, magnets 66 are made of ceramic or are strong neodymium magnets. Even though cavities 64 and magnets 66 are shown as being circular, they can be square or rectangular.

Holders 56, 58 are secured to shaft member 52 by an E-type retainer ring (not shown) which has several projections which fit into a splined section 74 around the outer periphery of hub member 52. Above this spline section 74 is a toothed section 75. A spring member 76 fits down through openings 62 of holders 56, 58 and into hub member 52 at one end and up into a dial plate 78 at the other end.

Dial plate 78 has an upper surface divided into four sections 80, 82, 84, 86 containing the words "open" and "close", and one degree increments for a total of 360 degrees. Dial plate 78 has a center aperture 88 with an inner side wall having a number of teeth (not shown) which meshes with the toothed section 75 of hub member 52. Both hub member 52 and spring 76 are received in center aperture 88 of dial plate 78.

Dial plate 78, shaft adaptor 40, and base plate 50 are locked together by a lock screw 89 which is received in center aperture 88 of dial plate 78, extends through spring 76 and is threaded into hex shaft 41 of adaptor 40. Spring 76 provides a positive force eliminating bounce of the dial assembly 49 of position indicator and control device 14.

Magnet holders 56, 58 each have a top ear portion 92 shown best to the top of FIG. 7. When dial assembly 49 is assembled, dial member 78 is disposed between the two ear portions 92 of holders 56, 58 to retain magnet holders 56, 58 in place.

Magnet holders 56, 58 and dial plate 78 are made of a molded thermoplastic similar to base plate 50. Preferably, the letters for the words "open" and "close" and degree increments on dial plate 78 are raised letters cast in the plastic mold, and that even though not shown the quadrants 82 and 86 for the words "close" are painted a dark color, such as black or red and the quadrants 80 and 84 are light colors. A plexiglas cover 94 is secured to dome housing 44, through means not shown, and can be molded to housing 44 as a one-piece construction if thermoplastic is used.

Dome housing 44, base plate 46, and cover 94 are constructed to be easily removed as explained hereinbefore for easy access to dial assembly 49. If dome housing 44 and cover 94 are separate members, then cover 94 can be siliconed to housing 44. This siliconing process along with the use of gasket 47 aid in making assembly 14 water tight. Preferably, cover 94 has quadrants, which are both transparent and blackened. From the foregoing, it is easy to appreciate that if the top of position indicator and control device 14 is totally darkened, then the valve in mechanism 16 is closed. If the top of device 14 has both a combination of light and dark sections, then the valve in mechanism 16 is opened.

To set the magnet holders 56, 58 lock screw 89 in plate 78 is loosened slightly. Dial plate 78 is pushed upward by the force of the spring 76. The toothed section 75 of hub 52 guides dial plate 78 in its upward movement. Once dial plate 78 has risen above ear portion 92 of magnet holders 56 and 58, magnet holders 56 and 58 are adjusted.

This adjustment takes place by the operator pushing magnet holders 56 and 58 inwardly toward hub member 52 of base plate 50 away from teeth 55 on sidewall 53 of base plate 50, which preloads spring clips 68. Magnet holders 56 and 58 are now rotated by the operator to an appropriate position which will trip switches 96 and 98. Once in the desired positioning, magnet holders 56 and 58 are released, and spring clips 68 force teeth 72 of magnet holders 56 and 58 into teeth 55 of sidewall 53 of base plate 50. Dial plate 78 can now be rotated in its desired position. Screw 89 is tightened, forcing dial plate 78 downward between ear portions 92 of magnet holders 56 and 58 thereby retaining magnet holders 56, 58 in place.

When lock screw 89 is tightened, the internal teeth (not shown) of center aperture 77 of plate 78 will mesh with toothed section 75 of hub member 52. This meshing provides a mechanical lock between dial plate 78 and base plate 50. As dial assembly 49 is caused to rotate by the shaft 35 of valve device 16, dial plate 78 is caused to rotate to reveal the words "open" or "close" through cover 94. As can be seen in FIG. 7, cover 94 reveals the word "open", which in effect, represents the condition of valve device 16.

Hub 54 of dial assembly 48 is made to accept a hex shaft 41 of adaptor 40. Several types of additional adaptors can be attached preferably by welding to hex shaft 41, which would allow the use of the invention on different types of valves and/or actuators or on other equipment.

Upon operation of the rotary shaft position sensing and control device 14, dial assembly 49 is caused to rotate by the shaft of valve mechanism 16, which causes the magnets 66 to rotate over the magnetic sensing area of switch mechanism 12.

Switch mechanism 12 will now be discussed with particular reference to FIGS. 5, 5a, 5b, 5c, and 6. Switch mechanism 12 comprises a housing 95 and two magnetic proximity switches 96, 98 schematically illustrated in FIG. 5. Switches 96, 98 are attached to a terminal plate 100 and preferably, are switches similarly disclosed in U.S. Pat. No. 4,745,383 issuing to the present inventor, and which is incorporated by reference. Switches 96, 98 can be either single pole, double throw or double pole, double throw. In referring to FIG. 5c, each switch 96, 98 is totally in-cased preferably in an epoxy resin or a thermoplastic. This encasing is indicated at 101 in FIG. 5c. Several spacer members, some of which are indicated at 102, 104, 106 are formed by this epoxy resin or thermoplastic to separate the two armatures 108, 110 of proximity switches 96, 98.

Still referring to FIG. 5c, several electrical leads two of which are indicated at 114 and 116 are encased in the encasement or enclosure 101 and are electrically connected to the contacts and the armatures 108 and 110 of switches 96, 98. For clarity, only electrical leads 114, 116 are shown for the one side of switch 98, but it is to be understood that there is a third lead on the same side of leads 114, 116 of 98 switch and that similar electrical contact connections are also provided on the other side of switch 98 and along the two sides of switch 96.

Switches 96, 98 are preferably secured to terminal base plate 100 by a high temperature silicon type glue compound. Terminal plate 100 is made of a fiberglass and has several copper electrical contacts with open apertures, one of which is indicated at 118 in FIG. 5c. Once the compound has set, the leads 114, 116 are soldered to terminal plate 100 thereby pro-jading an electrical connection as well as a secure mechanical connection for switches 96 and 98 with plate 100. Terminal plate 100 is secured in housing 95 by using a bead of silicon around the periphery of the plate and allowing it to set in the housing 95. This acts as both a glue and a seal.

Preferably, base plate 100 is for 94.0 volts. Terminal base plate 100 allows for easy and precise placement of the switches 96, 98 in switch housing 95. This placement of terminal plate 100 in housing 95 forms a junction box cavity 120 as particularly shown in FIG. 5b. Electrically connected to terminal base plate 100, and extending into cavity 120 are several terminal strips 122, 124, 126, 128. Each strip 122-128 has several electrical contacts, one of which is indicated at 130 in FIG. 5a. Preferably, terminal strips 122-128 are of the 45 degree type which allows them to be easily wired and electrically connected to switches 96, 98. Terminal strips 122-128 are commercially available and are manufactured by WECO, located in Kirkland, Quebec, Canada, under code 965-T-05/03. Preferably, a layer of potting compound is placed between the terminal plate 100 and the strips 122-128. This layer may be ¼ inch or ⅜ inch. This also acts as a bonding and sealing for the switches 96, 98 in housing 95.

As stated hereinbefore, FIG. 5b illustrates a junction box cavity 120 formed in housing 95. Adjacent to and communicating with cavity 120 is a coupling 132 shown to the right of FIG. 5b and a solenoid connection 134 shown to the left of FIG. 5b. The concentric circles indicated at 121 and 123 represent schematically the magnetic sensing area of switches 96 and 98.

Coupling 132 and solenoid connection 134 are, preferably, made of extruded heavy metal tubing which are welded to the outer surface of switch housing 95. Preferably, housing 95 is made of sheet metal, which is bent and welded to form the rectangular configuration as best shown in FIG. 5.

As can be seen in FIG. 5, housing 95 has a center "U" type indentation located in a top wall 135 and indicated at 136. This indentation 136, along with spacers 102, 104, 106 (FIG. 5c) of the encasement 101 for proximity switches 96, 98 aids in retaining switches 96, 98 in a proper positioning in housing 95.

It is easily understood, that for a single pole, double throw mode for each switch 96, 98, one terminal strip 122 is connected to switch 98, and one terminal strip 128 is connected to switch 96. For a double pole, double throw mode for switches 96, 98, both terminal strips 122 and 124 are connected to switch 98, and terminal strips 126 and 128 are connected to switch 96.

Generally, the embodiment for a switch mechanism 12 shown particularly in FIGS. 5 and 5b illustrate a switch mechanism 12 which is known in the industry as being non-explosive proof.

Referring particularly to FIGS. 5 and 5b, junction box cavity 120 is enclosed by plate 136 which is secured on an outer surface of switch housing 95 by a hinge member 138 disposed on the one end of plate 136 which is shown best in FIG. 1.

Plate 136 has openings 140, 142 for receiving threaded members 144, 146 which extend through openings 140, 142 and into bracket 148 mounted on housing 95 (best shown in FIG. 1). Members 144, 146 are held in place in bracket 148 by nuts or end caps. A second plate 149 is used for supporting a terminal base plate (not shown) similar to plate 100 and additional strip terminals similar to 122-128 (not shown for clarity). Cover plate 136 is preferably welded to plate 149.

Housing 95 of switch mechanism 12 has a number of threaded members welded to its sides and shown at 150, 152, 154 and 156 in FIG. 5b.

Figure 6:
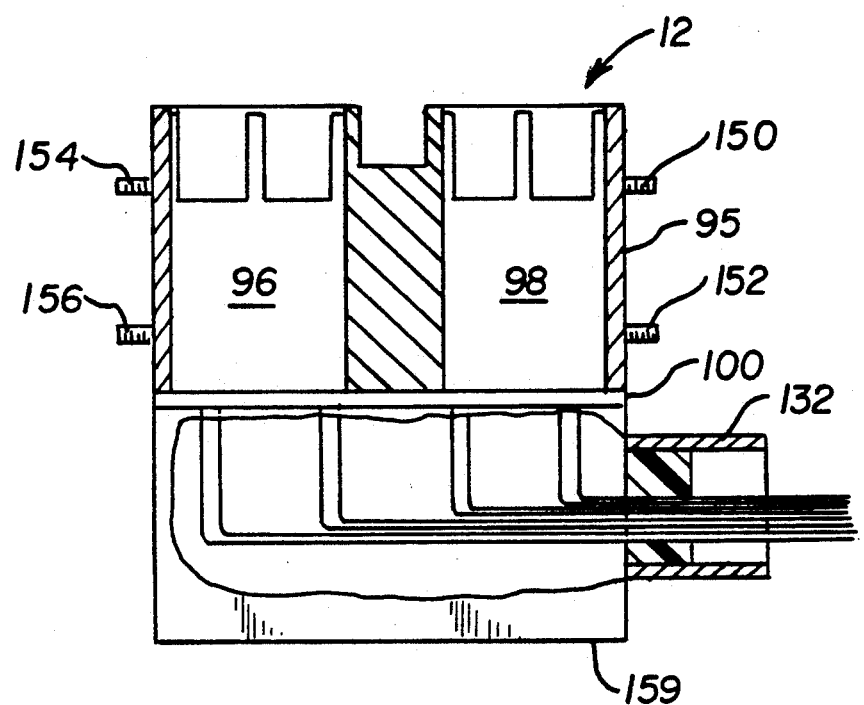
FIG. 6 is a sectional view of a second embodiment of the invention for an explosive proof type switch mechanism wherein the switch assemblies are shown schematically.

To those skilled in the art, it can be appreciated that even though FIGS. 5 and 5b represent a "non-explosive" proof switch mechanism 12, an "explosive" proof type switch mechanism can also be provided. FIG. 6 illustrates an example for an explosive proof type switch mechanism. In FIG. 6 junction box cavity 120 is entirely filled with a potting compound or red epoxy and coupling 132 is filled with a potting compound. An end plate 159 is welded to housing 95. For an "explosive" proof type switch mechanism, solenoid connection 134 is not provided. Strips 122-128 of FIG. 5 are not necessary for an "explosive" proof type switch mechanism of FIG. 6. The wires 114 and 116 of switches 96, 98 can be soldered directly to terminal plate 100. Terminal plate 100 is affixed in housing 95 by placing a bead of silicon around the periphery of the plate 100 and allowing it to set. This acts as both a glue and seal.

Figure 4:
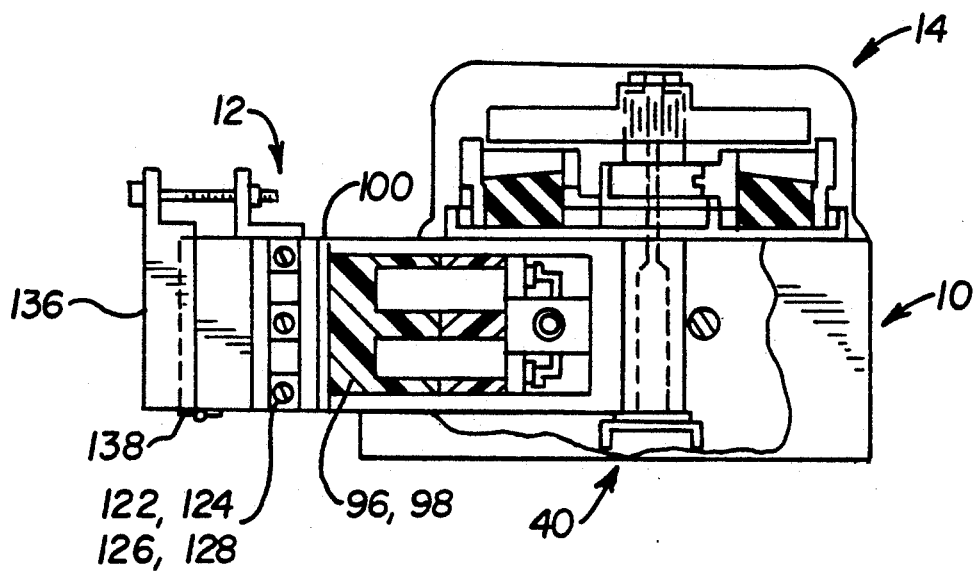
FIG. 4 is a sectional view taken along lines 4—4 of FIG. 3, and only showing the present invention.

As can be appreciated from the foregoing, mounting assembly 10 and rotary position indicator and control device 14 are mounted on the rotary shaft of valve mechanism 16. Switch mechanism 12 is slid into the housing 18 of mounting assembly 10 whereby threaded members 150-156 of switch mechanism 12 enter into elongated slots 28 of housing 18 (best shown in FIG. 1). The extent of travel for switch mechanism 12 upon its insertion into housing 18 of mounting assembly 10 is limited by the length of slots 28 in housing 18 which causes switch mechanism 12 to be disposed adjacent to the shaft element 34 of housing 18 of mounting assembly 10. This is best shown in FIG. 4.

Figure 2:
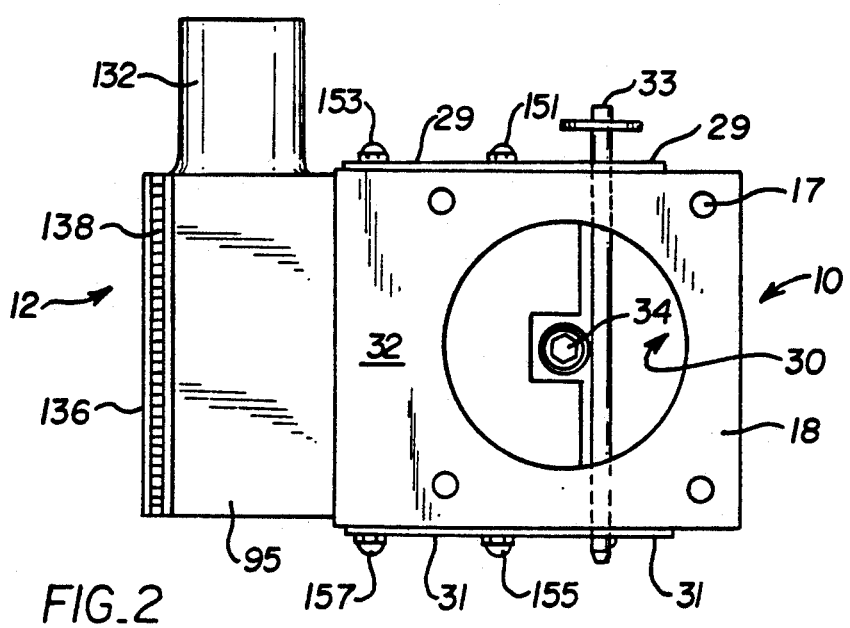
FIG. 2 is an elevational view of the present invention taken along lines 2—2 of FIG. 1.

The slide-lock plates 29, 31 have several holes, one indicated at 161 in FIG. 5 and are attached to switch mechanism 12 by threaded members 150, 152, 154, 156 and locknuts 151, 153, 155, and 157 (FIG. 2). As switch mechanism 12 slides into mounting assembly 10, plates 29, 31 are on the outside of housing 18. Hole 163, 165 in slide lock plates 29, 31, respectively, correspond to a hole in housing 18 (FIG. 7) in which quick release pin 33 is pushed. This provides, as discussed hereinbefore, a secure mechanical locking of switch mechanism 12 in housing 18 of mounting assembly 10.

Figure 3:
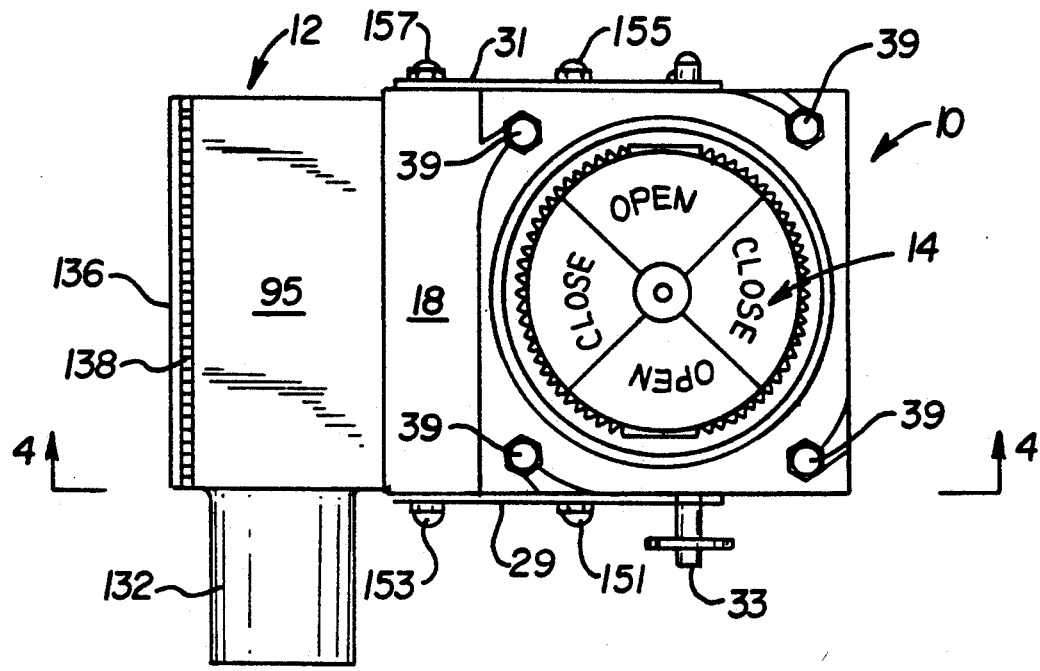
FIG. 3 is an elevational view of the present invention taken along lines 3—3 of FIG. 1.

Lock nuts 151, 153, 155, and 157 are then secured onto threaded studs 150-156, respectively, as shown best in FIG. 3.

Until now, the invention has been explained with respect to FIGS. 1-7 for a rotary valve arrangement.

Figure 8:
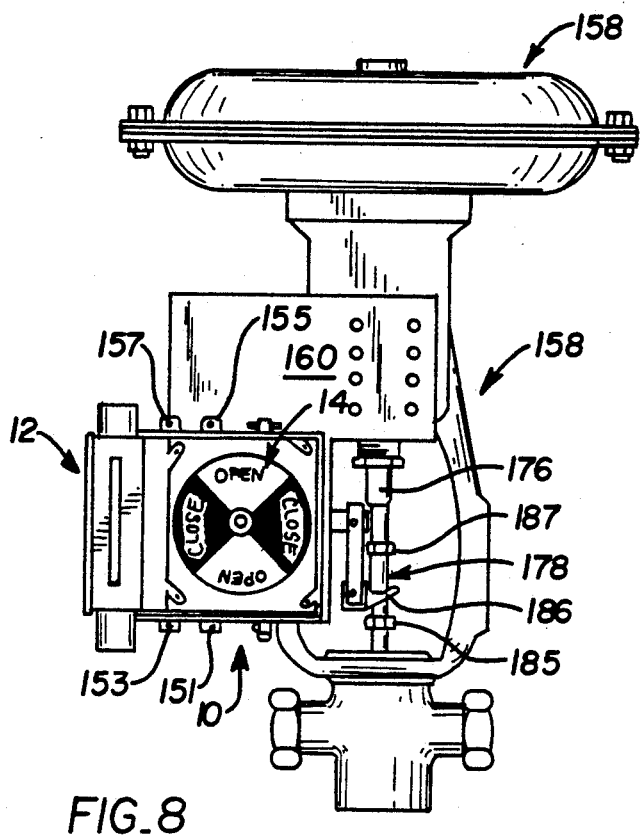
FIG. 8 is a side elevational view of a second embodiment of a mounting assembly for a linear shaft with a switch mechanism and a rotary position indicator and control device of the present invention operatively mounted on a linear valve mechanism.
Figure 8A:
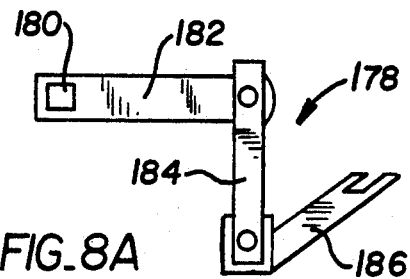
FIG. 8a is an enlarged perspective view of a bracket system for connecting the rotary position indicator and control device of FIG. 8 to the linear valve mechanism.
Figure 8B:
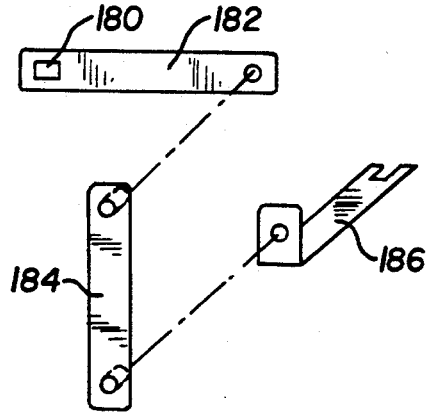

FIGS. 8-10 illustrate the invention as mounted on a linear valve arrangement.

In particular, FIGS. 8, 8a, 8b, and 8c illustrate the manner in which mounting assembly 10, rotary position indicator and control device 14, and switch mechanism 12 are mounted on a linear valve mechanism 158. This is accomplished through a bracket plate 160, which is mounted to valve mechanism 158.

As best shown in FIG. 8c, bracket plate 160 has several mounting holes, one indicated at 163 which correspond to mounting holes 17 in mounting assembly 10. Housing 18 is attached to bracket plate 160 by bolts (not shown) received in holes 17 of housing 18 and holes 163 of bracket plate 160. An aperture 165 in plate 160 allows shaft adaptor 40 of shaft position indicating device 14 to extend therethrough. Adaptor 40 is connected to the linear shaft 176 (FIG. 8) by a bracket system 178 best shown in FIGS. 8a and 8b. Bracket system 178 comprises members 182, 184 and 186. Member 186 is connected to members 182 and 184 through bearings (not shown). Member 182 has a square aperture 180.

Referring again to FIG. 7, shaft adaptor 40 has a hex output shaft 41. In the embodiment of FIGS. 8, 8a, 8b and 8c, bottom portion 43 of adaptor 40 is removed and preferably, a washer (not shown) can be welded in place around the body of shaft 41. Shaft 41 can be made to be easily inserted into square aperture 180 of bracket system 178. For example, a ¼" hex shaft 41 would fit into a ¼" square aperture 180 of member 182. Once shaft 41 is inserted through aperture 180, a locking screw (not shown) can be inserted into the threaded end of hex shaft 41 thereby securing shaft 41 to bracket system 178.

Member 186 is connected to shaft means 176 by means of a mounting fork which is part of member 186. Even though not shown clearly, shaft means 176 consists of an actuator shaft and a valve shaft having threaded end portions which are coupled together. Nuts 185 and 187 are mounted on the threaded portion of shaft means 176. The forked end of member 186 is disposed around shaft means 176 and secured in place by nuts 185 and 187. By this arrangement of bracket system 178 connected to shaft adaptor 40, the linear movement of shaft means 176 of valve mechanism 158 is translated into rotational movement, which, in effect, rotates the magnets 66 of rotary position device 14 to activate the switch mechanism 12.

Figure 9A:
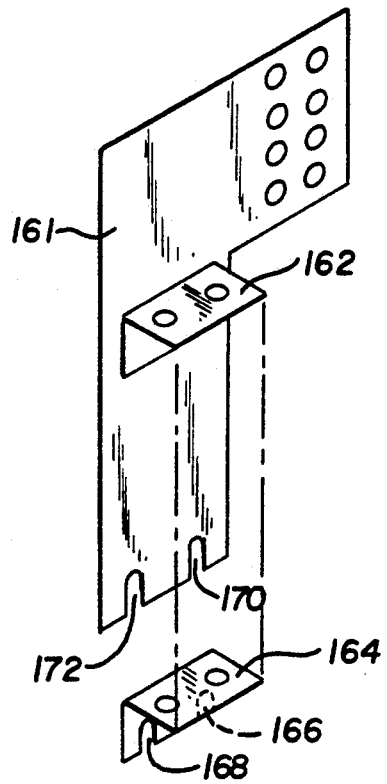
FIG. 9a is an exploded, enlarged perspective view of the bracket plate system for mounting the invention of FIG. 9.

An alternative for mounting the present invention to linear valve mechanism 158 is further shown with reference to FIGS. 9, 9a, and 10. As shown best in FIG. 9a, bracket plate 161 is mounted to valve mechanism 158 and has L-shaped brackets 162 and 164 which are secured to the sides of switch mechanism. Bracket 164 has slots 166, 168 which cooperate with slots 170, 172 of bracket plate 161 for receiving bolts and nuts (not shown). Bracket plates 162 and 164 have several holes for receiving threaded stubs 150-156 of switch mechanism 12, when switch mechanism 12 is dispose between brackets 162 and 164. Switch mechanism 12 is held in place between brackets 162 and 164 by locking nuts 151, 153, 155, and 157, shown best in FIG. 9.

A bracket-magnet assembly 188 is mounted to linear shaft 176, through means explained hereinbefore with reference to FIGS. 8, 8a, 8b and 8c.

Bracket-magnet assembly 188 is comprised of bracket members 190, 192 which are connected together, preferably by welding. Member 190 is attached by means of its forked end to shaft means 176. Bracket 192 has an elongated slot 194 FIG. 10) which carries annular magnets 196, 198, which are held in position by members 200, 202 respectively, which members 200, 202 have bolts which extend into slot 194 and which are fastened in place by end caps 204, 206. As shaft means 176 moves translationally or linearly, brackets 190 and 192 move in the same translational direction resulting in magnets 196, 198 travelling adjacent to and across the magnetic end sensing area 121 and 123 of switch mechanism 12, thereby actuating the proximity switches 96, 98.

Whereas, particular embodiments of this invention have been described herein for purposes of illustration, it will be evident to those skilled in the art that numerous variations of the details of the present invention may be made without departing from the invention as defined in the appended claims. For instance, proximity switches other than those shown herein can be used.

I claim:

1. An arrangement associated with a shaft of a device for indicating an operative or an inoperative state for said device, comprising:
   a switch mechanism including a unitary enclosure having a cavity and magnetic proximity switch means in said cavity for producing electrical signals upon actuation thereof,
   a mounting assembly for slideably receiving and supporting said switch mechanism as a unit,
   shaft position indicator and control means associated with said mounting assembly and said switch mechanism and having magnetic means, and
   means for coupling said shaft position indicator and control means to said shaft of said device,
   said unitary enclosure of said switch mechanism substantially enclosing said cavity and said proximity switch means in said cavity,
   said mounting assembly including means for positioning said switch mechanism in the vicinity of said magnetic means of said shaft position indicator and control means,
   said shaft position indicator and control means further including means connected to said shaft coupling means for rotating said magnetic means of said shaft position indicator and control means to cause said magnetic means of said indicator and control means to travel adjacent to said magnetic proximity switch means of said switch mechanism for said actuation of said switch means upon said movement of said shaft of said device during said operative state of said device.

2. An arrangement of claim 1, wherein said device is a rotary valve, and wherein said movement of said shaft is rotational.

3. An arrangement of claim 1, wherein said device is a linear valve, and wherein said movement of said shaft is linear.

4. An arrangement of claim 1, wherein said switch mechanism further comprises:
   terminal plate means in said cavity and electrically connected to said switch means,
   terminal strip means in said cavity and electrically connected to said terminal plate means and said switch means,
   means for positioning said switch means, said terminal plate means, and said terminal strip means in said cavity at one end of said enclosure and, whereby the dimension of said enclosure is such as to form a junction box cavity at the other end of said cavity of said enclosure wherein said terminal plate means extends into,
   conduit means communicating with said junction box cavity for carrying electrical means which are electrically connected to said terminal strip means for generating said electrical signals, and
   cover means located adjacent to said junction box cavity for access into said enclosure of said switch mechanism.

5. An arrangement of claim 1, wherein said switch mechanism further comprises:
   terminal plate means in said cavity and electrically connected to said switch means,
   means for positioning said switch means and said terminal plate means in said cavity at one end of said enclosure and, whereby the dimension of said enclosure is such as to form a junction box cavity at the other end of said cavity of said enclosure,
   conduit means communicating with said junction box cavity for carrying electrical means which are connected to said terminal plate means for generating said signals,
   potting means for filling said junction box cavity, and
   means for permanently sealing said enclosure of said switch mechanism.

6. An arrangement of claim 5 wherein said terminal plate means is made of fiberglass, and consists of a plurality of electrical contacts and wherein,
   said proximity switch means has electrical lead means connected to said electrical contacts of said terminal plate means.

7. An arrangement of claim 1, wherein said switch mechanism further comprises means for generating a single pole, double throw mode for said switch means.

8. An arrangement of claim 1, wherein said switch mechanism further comprises means for generating a double pole, double throw mode for said switch means.

9. An arrangement of claim 1, wherein said mounting assembly comprises a housing which is substantially enclosed with an open end for slideably receiving said unitary enclosure of said switch mechanism, and
   means for securing said unitary enclosure of said switch mechanism in said housing of said mounting assembly.

10. An arrangement of claim 9, wherein said enclosure of said switch mechanism consists of external extension means, and
    wherein said housing of said mounting assembly has elongated slots in the sidewalls adjacent to said open end of said housing of said mounting assembly through which said external extension means of said enclosure of said switch mechanism extends when said enclosure of said switch mechanism is received in said housing of said mounting assembly, said elongated slots having a length being such as to limit the extent in which said enclosure of said switch mechanism extends in said housing of said mounting assembly, and wherein said means for securing said enclosure of said switch mechanism in said housing of said mounting assembly includes fixing means mounted on said extension means of said enclosure of said switch mechanism.

11. An arrangement of claim 10, wherein said means for securing said enclosure of said switch mechanism in said housing of said mounting assembly further includes a quick release pin and slide-lock plate means mounted on said housing of said mounting assembly, said slide-lock plate means having aperture means for receiving said extension means of said enclosure of said mechanism and said quick release pin.

12. An arrangement of claim 1, wherein said mounting assembly further comprises:

a housing which is substantially enclosed with an open end for slideably receiving said unitary enclosure of said switch mechanism, and means for supporting said position indicator and control means on an end of said housing of said mounting assembly opposite to said open end of said housing of said mounting assembly.

13. An arrangement of claim 12, wherein said shaft coupling means of said position indicator and control means extends through said housing of said mounting assembly for said coupling to said shaft of said device, and wherein said shaft is a rotary shaft.

14. An arrangement of claim 12, wherein said shaft coupling means of said position indicator and control means extends through said housing of said mounting assembly for said coupling to said shaft of said device, and wherein said shaft is a linear shaft and said movement is linear.

15. An arrangement of claim 14, wherein said shaft coupling means further comprises means for converting said linear movement of said shaft into rotational movement for rotating said magnetic means of said shaft position indicator and control means.

16. An arrangement of claim 14, further comprising bracket plate means attached to said device, and means for mounting said housing of said mounting assembly to said bracket plate means.

17. An arrangement of claim 1, wherein said rotary shaft position indicator and control means has a dial assembly, said dial assembly comprising:

circular plate means having a first side with an open inlet formed by an outer wall, first hub means extending outwardly from said first side and having an outward area with teeth means, and second hub means extending outwardly from a second side thereof, said outer wall of said circular plate means having teeth means extending into said open inlet thereof, holder means disposed in said open inlet of said first side of said circular plate means for carrying said magnetic means, and having teeth means meshing with said teeth means of said circular plate means, said holder means including means for mounting said holder means on said first hub means of said circular plate means, dial plate means mounted on said first hub means of said plate means, and having center hub means with teeth means meshing with said teeth means of said first hub means, and wherein said means for coupling said shaft position indicator and control means to said shaft of said device includes shaft adaptor means extending into said second hub means of said circular plate means, and securing means for holding said circular plate means, said holder means, said dial plate means, and said shaft adaptor means together as a unit.

18. An arrangement of claim 17, wherein said holder means includes resilient means which causes said teeth means of said holder means to mesh with said teeth means of said circular plate means for rotation therewith, and resilient means associated with said dial plate means for allowing displacement of said dial plate means relative to said circular plate means upon a loosening of said securing means.

19. An arrangement of claim 17, wherein said holder means consists of at least two holder members, and wherein said magnetic means consists of at least two circular magnets, one in each of said holder members.

20. An arrangement of claim 1, wherein said unitary enclosure of said switch mechanism is substantially rectangular, wherein said mounting assembly further comprises a housing which is substantially rectangular, and wherein said enclosure of said switch mechanism fits into said housing of said mounting assembly.

21. An arrangement of claim 1 wherein said rotary position indicator and control means further comprises:

a dial assembly for carrying said magnets, a dome housing surrounding said dial assembly, and cover means associated with said dome housing for protecting said dial assembly.

22. An arrangement of claim 21, wherein said device is a valve mechanism, and wherein said dial assembly contains light and dark surface areas for indicating an open and closed condition for said valve mechanism, and wherein said cover means contains opaque and transparent surface areas, whereby upon rotary movement of said dial assembly, a first movement of said shaft is indicated on said cover means as having a combination of light and dark surface areas, and a second movement of said shaft is indicated on said cover means as having a totally substantially dark surface area.

23. An arrangement associated with a shaft of a device for operation upon an operative state of said device, comprising:

a switch mechanism having magnetic proximity switch means for producing said electrical signals upon actuation thereof, a mounting assembly for slideably receiving and supporting said switch mechanism on said device, said switch mechanism including a unitary enclosure with a cavity for carrying said proximity switch means and for substantially enclosing said proximity switch means in said cavity for easy insertion of said switch mechanism into said mounting assembly as a unit, and means for associating said shaft with said switch mechanism, and including magnetic means positionable in proximity to said magnetic switch means upon said movement of said shaft for said actuation of said switch means during said operative state of said device.

24. An arrangement of claim 23, wherein said shaft is a linear shaft, and wherein said means for associating said shaft with said switch means includes means for causing said magnetic means to travel parallel and adjacent to said magnetic proximity switch means.

25. An arrangement of clam 24, wherein said means for associating said shaft with said switch means includes a first brace member connected to said linear shaft, and a second brace member connected to said first brace member and including means for carrying said magnetic means.

26. An arrangement of claim 23, wherein said mounting assembly comprises bracket plate means attached to said device, and
L-shaped bracket means for said supporting of said switch mechanism.

27. An arrangement of claim 23, wherein said switch mechanism further comprises:
terminal plate means in said cavity and electrically connected to said switch means,
terminal strip means in said cavity and electrically connected to said terminal plate means and said switch means,
means for positioning said switch means, said terminal plate means, and said terminal strip means in said cavity at one end of said enclosure and whereby the dimension of said enclosure is such as to form a junction box cavity at the other end of said cavity of said enclosure where said terminal plate means extends into,
conduit means communicating with said junction box cavity for carrying electrical means electrically connected to said terminal strip means for generating said electrical signals, and
cover means located adjacent to said junction box cavity for access into said enclosure of said switch mechanism.

28. An arrangement of claim 23 wherein said switch mechanism further comprises:
terminal plate means in said cavity and electrically connected to said switch means,
means for positioning said switch means and said terminal plate means in said cavity at one end of said enclosure and, whereby the dimension of said enclosure is such as to form a junction box cavity at the other end of said cavity of said enclosure,
conduit means communicating with said junction box cavity for carrying electrical means which are connected to said terminal plate means for generating said signals,
potting means for filling said junction box cavity, and
means for permanently sealing said enclosure of said switch mechanism.

29. A switch mechanism for generating electrical signals and used with external device means whereby said signals are generated upon an operative state for said device, comprising:
proximity switch means,
an enclosure having a cavity for carrying said proximity switch means and substantially enclosing said switch means in said cavity,
terminal plate means in said cavity and electrically connected to said switch means,
terminal strip means in said cavity and electrically connected to said terminal plate means and said switch means,
means for positioning said switch means, said terminal plate means, and said terminal strip means in said cavity at one end of said enclosure and whereby the dimension of said enclosure is such as to form a junction box cavity at the other end of said cavity of said enclosure where said terminal plate means extends into,
conduit means communicating with said junction box cavity for carrying electrical means which are electrically connected to said terminal strip means for generating said signals, and
cover means located adjacent to said junction box cavity for access into said switch mechanism.

30. A switch mechanism for generating electrical signals and used with external devices whereby said signals are generated upon an operative state for said device, comprising:
proximity switch means,
an enclosure having a cavity for carrying said proximity switch means and substantially enclosing said switch means in said cavity,
terminal plate means in said cavity and electrically connected to said switch means,
means for positioning said switch means and said terminal plate means in said cavity at one end of said enclosure and, whereby the dimension of said enclosure is such as to form a junction box cavity at the other end of said cavity of said enclosure,
conduit means communicating with said junction box cavity for carrying electrical means which are connected to said terminal plate means for generating said signals,
epoxy means for filling said junction box cavity, and
means for permanently sealing said enclosure of said switch mechanism.

31. A mounting assembly for a magnetic switch mechanism which provides electrical signals upon movement of an element of an external device in an operative state of said device, comprising:
a housing which is substantially enclosed and having an opening for slideably receiving and removing said switch mechanism as a unit,
magnetic position indicator and control means mounted on said housing and having means for connecting said position indicator and control means to said element of said device for operation of said position indicator and control means,
said housing including means for positioning said switch mechanism adjacent to said magnetic position indicator and control means in a manner said operation of said position and control means by said element of said device operates said magnetic switch mechanism.

32. A dial assembly for indicating and controlling the movement of an element of an external device, and associated with magnetic switch means which provides electrical signals upon the movement of said element in an operative state of said device comprising:
means for connecting said dial assembly to said element of said device,
circular plate means having a first side with an open inlet formed by an outer wall, first hub means extending outwardly from said first side and having an outward area with teeth means, and second hub means extending outwardly from a second side thereof, said outer wall of said circular plate means having teeth means extending into said open inlet thereof, holder means disposed in said open inlet of said first side of said circular plate means for carrying said magnetic means, and having teeth means meshing with said teeth means of said circular plate means, said holder means including means for mounting said holder means on said first hub means of said circular plate means, dial plate means mounted on said first hub means of said plate means, and having center hub means with teeth means meshing with said teeth means of said first hub means, securing means for holding said circular plate means, said holder means, said dial plate means, and said shaft adaptor means together as a unit, said holder means including resilient means which causes said teeth means of said holder means to mesh with said teeth means of said circular plate means for rotation therewith, and resilient means associated with said dial plate means for allowing displacement of said dial plate means relative to said circular plate means upon a loosening of said securing means.

* * * * *